Aug. 11, 1942.  A. C. WILCOX  2,292,854
ELECTRIC HEATING DEVICE
Filed April 3, 1941   3 Sheets-Sheet 1

Inventor
Albert C. Wilcox
By Frease and Bishop
Attorneys

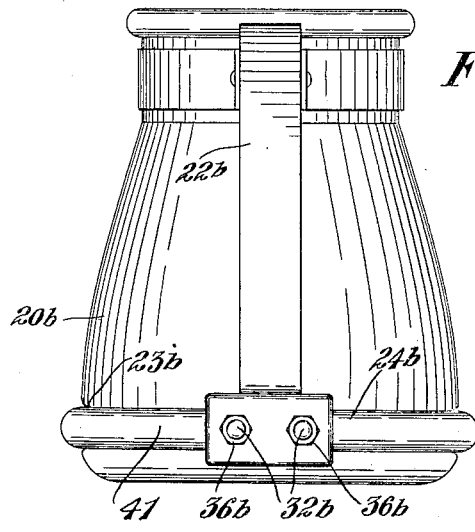
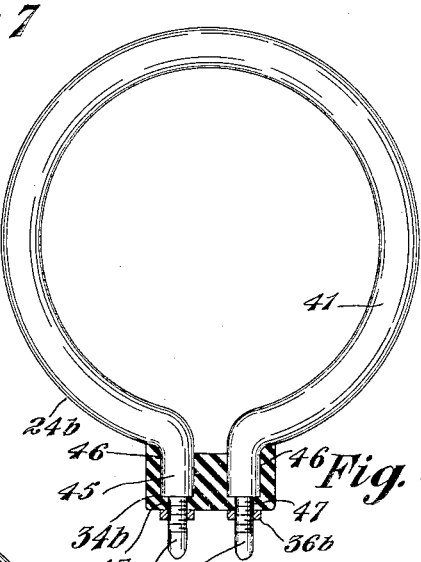
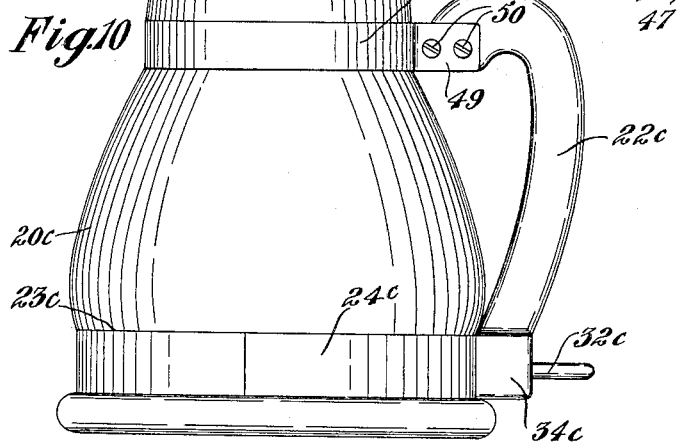
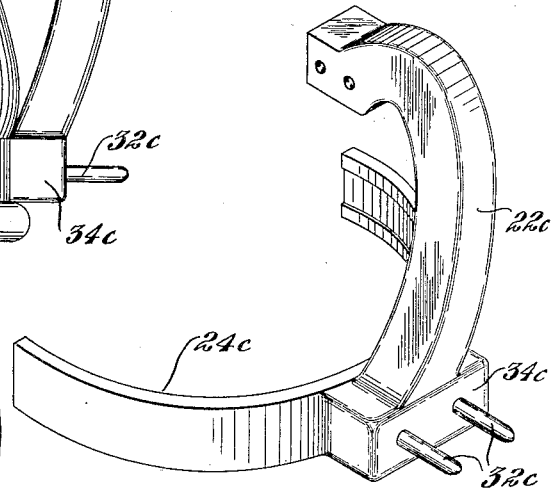
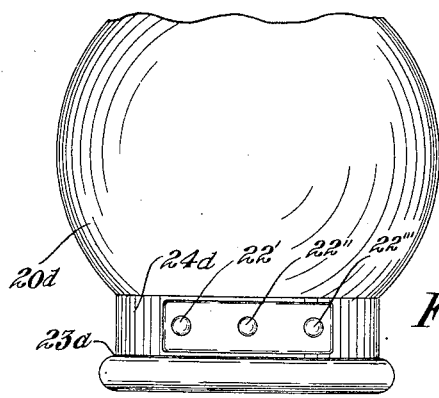

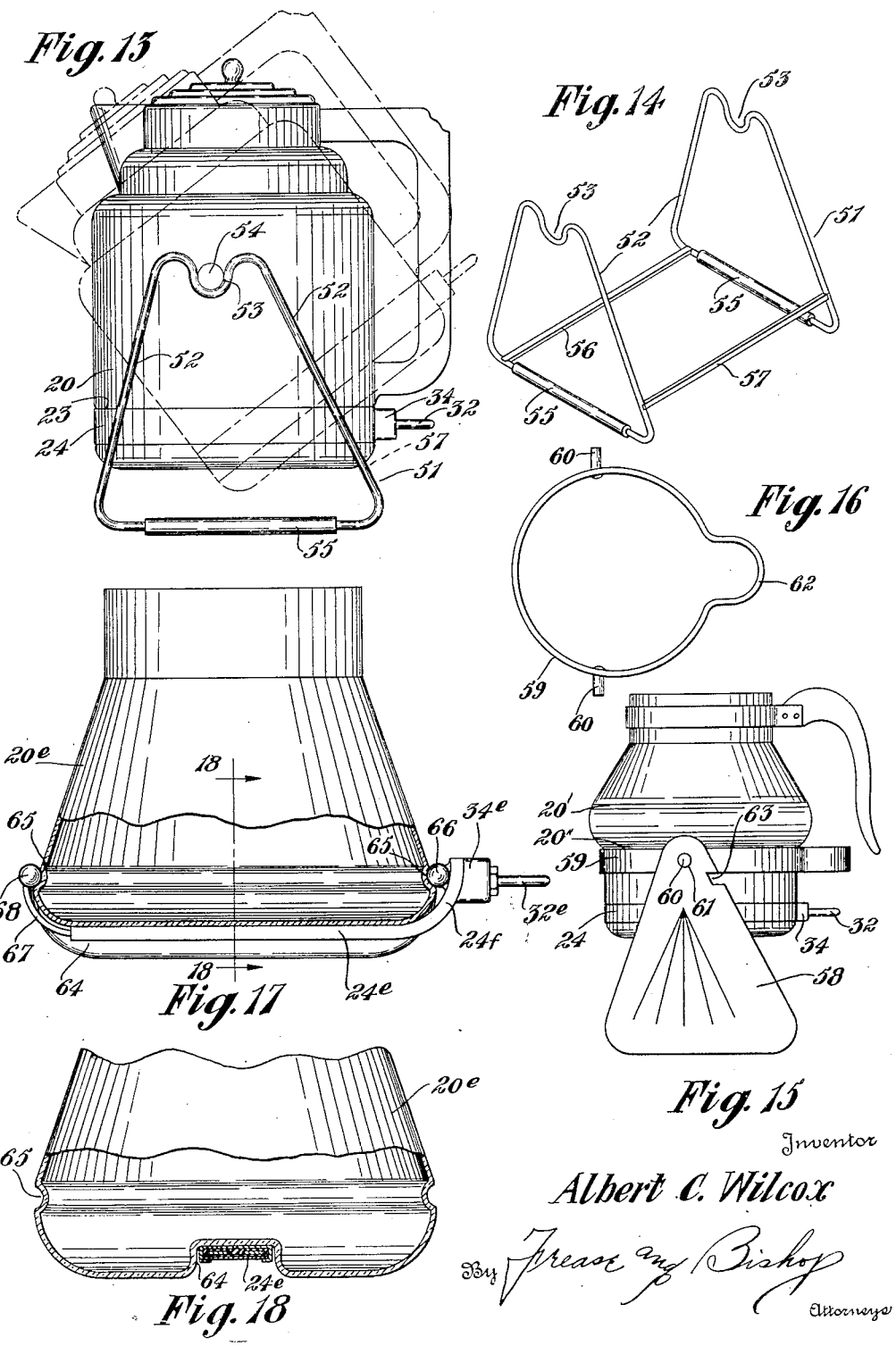

Patented Aug. 11, 1942

2,292,854

UNITED STATES PATENT OFFICE 2,292,854

ELECTRIC HEATING DEVICE

Albert C. Wilcox, Chicago, Ill.

Application April 3, 1941, Serial No. 386,621

2 Claims. (Cl. 219—44)

The invention relates to an electric heating device and more particularly to a heating unit adapted to be detachably connected to the outside of a utensil.

Although the improved heating unit is adapted for connection to any type of utensil regardless of whether the same is formed of glass, porcelain, metal, or other material, it is especially adapted for attachment to the outside of the lower coffee pot or container of a drip or vacuum coffee maker so as to maintain the coffee at the proper temperature for serving.

The object of the improvement is to provide an electric heating device in the form of a sealed unit arranged to be detachably connected to the outside of a utensil.

Another object is to provide a heating unit of this character in the form of a split ring or band arranged to be located around the outside of a utensil and clamped thereon.

Still another object of the invention is to provide a heating unit of this character in which the detachable band heating unit is carried by the handle of the utensil.

Figure 1:
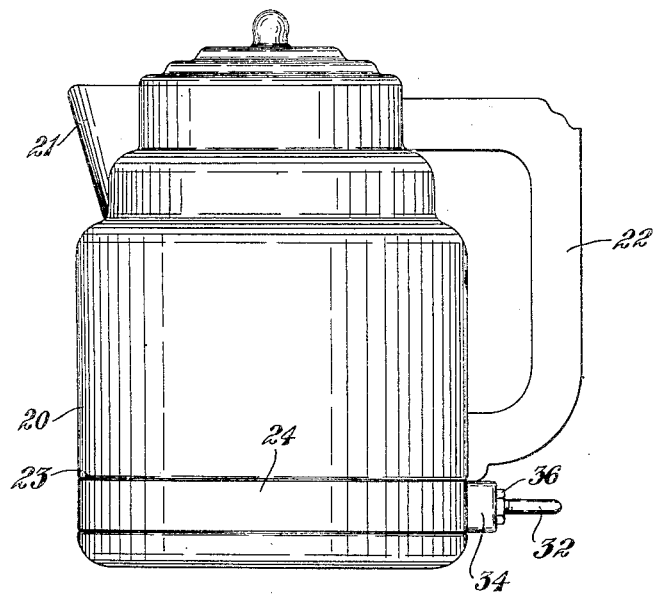
Figure 3:
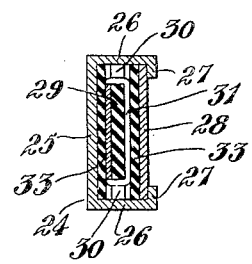
Figure 2:
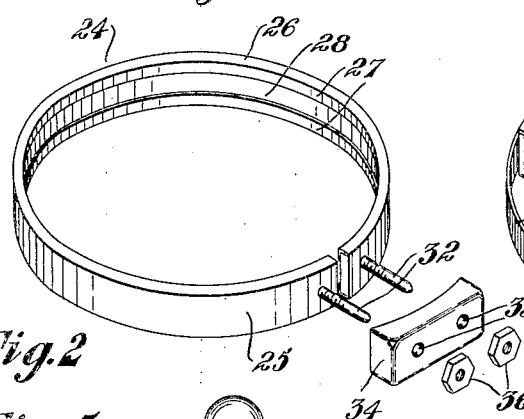
Figure 6:
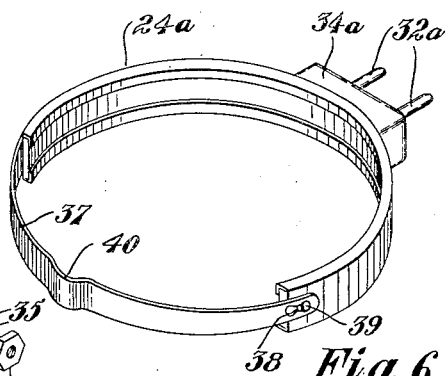
Figure 5:
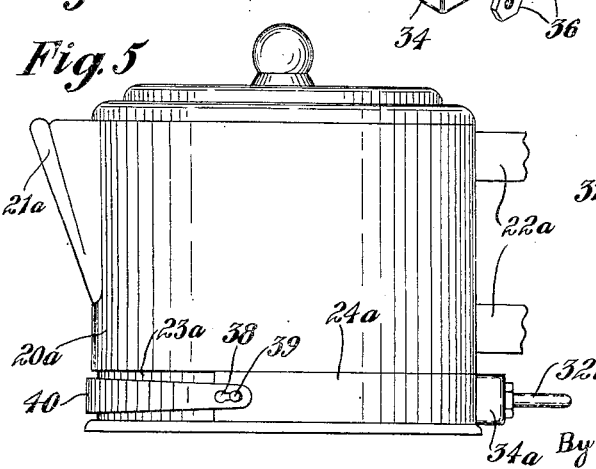
Figure 4:
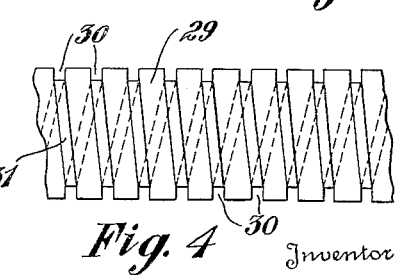

The above objects together with others which will be apparent from the drawings and following description, or which may be referred to, may be attained by constructing the improved heating unit in the manner illustrated in the accompanying drawings in which Figure 1 is a side elevation of the lower coffee pot or container of a drip or vacuum coffee maker showing the improved electric heating unit located around the lower portion thereof in the form of a split ring clamped within an external groove in the coffee pot;

Fig. 2, an expanded perspective view of the band heating unit shown in Fig. 1;

Fig. 3, an enlarged transverse sectional view through the heating unit;

Fig. 4, a detail elevation of a portion of the heating element located within the improved heating unit;

Fig. 5, a side elevation of a coffee pot showing a modified form of the heating unit;

Fig. 6, a detached perspective view of the heating unit shown in Fig. 5;

Fig. 7, a rear elevation of a glass coffee container with a band or ring heating unit encased in a circular tube;

Fig. 8, a detached plan section of the heating unit shown in Fig. 7;

Fig. 9, a transverse sectional view through the heating unit shown in Figs. 7 and 8;

Fig. 10, a side elevation of a coffee container showing the heating unit attached to the handle;

Fig. 11, a detached perspective view of the handle and heating unit shown in Fig. 10;

Fig. 12, a fragmentary elevation of a glass coffee container showing a high and low stage band heating unit applied thereto.

Fig. 13, a side elevation of a coffee container such as shown in Figure 1 mounted in a metal cradle which supports the coffee pot raised above the surface of the table and permits of pouring the coffee therefrom without removing the pot from the cradle;

Fig. 14, a detached perspective view of the cradle shown in Fig. 13;

Fig. 15, shows another form of cradle with coffee pot mounted therein;

Fig. 16, a plan view of the pivoted ring forming part of the cradle shown in Fig. 15;

Fig. 17, a sectional elevation of a utensil with a different type of heating unit band extending diametrically through a groove in the bottom wall of the utensil; and Fig. 18, a section taken as on the line 18—18, Fig. 17.

Similar numerals refer to similar parts throughout the several views.

Referring first to the form of the invention illustrated in Figs. 1 to 4, inclusive, a coffee pot or lower coffee container of a drip coffee maker, formed of porcelain or the like, is indicated generally at 20 and provided with the usual pouring spout 21 and handle 22.

A circumferential groove 23 is formed around the pot 20 near the bottom thereof to receive the improved heating unit which is in the form of a split ring or band indicated generally at 24.

This heating unit as well as the other modifications shown in the drawings and described hereinafter is a sealed unit so that no water, moisture, or the like will injure the same.

As shown in Figs. 2, 3, and 4, the improved band heating unit includes a housing formed of a metal strip 25 of substantially channel form having the upper and lower angular flanges 26 terminating at their ends in the narrow angular flanges 27 directed toward each other and swedged over the upper and lower edges of the metal strip 28 which closes the open inner side of the circular housing thus formed, enclosing the heating element therein.

The heating element is preferably of the form best shown in Figs. 3 and 4 and comprises a strip of mica 29 having spaced notches 30 in its upper and lower edges, a ribbon 31 of suitable heat resisting metal being wound upon this mica strip and through the notches 30 thereof and connected at its ends to the plug-in points 32 which extend outward from opposite ends of the split band.

Strips 33 of mica or the like are located upon each side of the heating element thus formed to insulate the same from the metal shell or housing.

The band heating unit, as shown in Fig. 2, is placed around the lower portion of the pot 20 within the groove 23 and the insulation terminal block 34 is positioned to connect the ends of the band, the plug-in points 32 being received through the spaced openings 35 in said terminal block and nuts 36 applied to the threaded portions of the plug-in points to clamp the band heating unit in position upon the coffee pot.

It should be understood that the improved heating unit to which the invention pertains is designed to be of low wattage type so as to furnish only sufficient heat to maintain the coffee at the desired temperature for serving.

In use it will be seen that an electric cord of usual construction may be plugged upon the points 32 operating the improved band heating unit to maintain the coffee in the pot at the desired temperature for serving until the coffee has been poured from the pot.

In Figs. 5 and 6 is shown a modification of the heating unit applied to a coffee pot or container 20a which may be of metal or the like provided with a spout 21a and handle 22a and having a circumferential groove 23a near its lower end.

The band heating unit indicated generally at 24a may be formed in the manner above described excepting that it does not form a complete ring, but as shown may be only slightly more than semicircular in form.

The plug-in points 32a and insulation terminal block 34a may be attached to the central portion of the band heating unit instead of to the ends thereof as shown in Fig. 2.

Thus as shown in Fig. 5 the band heating unit will extend only partially around the circumference of the utensil upon which it is to be used.

This type of the band heating unit is adapted to be attached by means of the arcuate spring clip 37 connected at one end to one end of the unit 24a and having a key hole slot 38 at its other end adapted to be received over the headed stud 39 carried by the other end of the unit 24a.

A curved portion 40 is formed at the center of the spring clip 37 adapted to be pressed inward toward the pot to sufficiently elongate the spring clip to permit the enlarged portion of the key hole slot 38 to be received over the head of the stud 39.

When pressure of this curved portion 40 is released the free end of the spring clip 37 will snap into place as shown in Fig. 5 and the added tension of the curved portion 40 will hold the band heating unit rigidly in place within the groove 23a of the pot.

In Figs. 7, 8, and 9 is shown another modification of the band heating unit in which the same may be of substantially circular cross sectional shape instead of flat as shown in the previous views.

This form of the invention is shown applied to a lower coffee container of glass or the like indicated generally at 20b and provided with a handle 22b, a circumferential groove 23b being formed around the lower portion of the coffee container to receive the heating unit indicated generally at 24b.

This heating unit is of split ring construction and is housed within a tubular metal shell or casing 41.

The heating element is in the form of a ribbon 42 wound upon a core 43 of asbestos or the like and surrounded by an insulation covering 44 of asbestos or the like to insulate the heating element from the metal shell or casing 41.

The ends of the band heating unit are outturned as shown at 45 and provided with the plug-in points 32b.

The insulation terminal block 34b is provided with suitable openings 46 to receive the outturned ends 45 of the unit, these openings being reduced as at 47 to receive the plug-in points 32b.

The assembly is fastened together around the utensil as by means of the nuts 36b received upon the threaded portions of the plug-in points.

In Figs. 10 and 11 is shown another modification of the invention in which the band heating unit may be mounted upon the handle of the utensil so as to be attached to or removed from the utensil by means of the handle.

This form of the invention is shown applied to a lower container or pot 20c which may be formed of glass or the like and provided near its lower end with a circumferential groove 23c.

The handle 22c may be formed of Bakelite or other insulation material and is connected to the upper portion of the utensil in usual and well-known manner as by a metal ring 48, the outturned ends 49 of which may be detachably connected to the upper end of the handle 22c as by screws 50.

A terminal block 34c may be formed integrally with the lower end of the handle 22c and the heating unit 24c, which may be formed in the manner above described, is substantially semicircular and provided with the plug-in points 32c embedded in and extending through the terminal block 34c so as to attach the heating unit to the handle.

As shown in Fig. 10 when the handle 22a is attached to the utensil the semi-circular heating unit 24c will be received in the circumferential groove 23c at the lower end portion of the utensil.

In Fig. 12 is shown a coffee container or the like indicated generally at 20d in which the band heating element 24d may be of any form above described and located around the groove 23d at the lower portion of the utensil.

This form of the invention is especially adapted for vacuum coffee makers and is designed to give either high or low heat for the purpose of making the coffee in the utensil and later maintaining the coffee at the desired temperature for serving.

For this purpose three plug-in points indicated at 22', 22", and 22''' are provided upon the heating unit.

By plugging in the points 22' and 22" the heating unit may be operated at high temperature for making the coffee; by then plugging in the points 22" and 22''' the heating unit may be operated at a lower temperature for maintaining the coffee at the desired temperature for serving.

In Figs. 13 and 14 is shown means for supporting a coffee pot, such as illustrated in Figure 1, spaced above the surface of the table and in position so that coffee may be poured therefrom without lifting the device from the table.

For this purpose a cradle is provided to support the pot 20, this cradle being formed of wire or the like and indicated generally at 51.

This cradle may comprise the two upright side members 52 each having a notch 53 at its upper end to receive the projections or trunnions 54 formed upon opposite sides of the pot 20 at a point slightly forward of the vertical center thereof.

The lower portions of the side members 52 of the cradle may be covered with tubes 55 of rubber or the like to prevent marring the surface of the table.

The side members 52 of the cradle are connected together by means of the bars 56 and 57, the rear bar 57 being in position to be engaged by the bottom of the pot 20 to support the pot in vertical position.

When it is desired to pour coffee from the pot it may be tilted to the broken line position shown in Fig. 13 without lifting it from the cradle.

Another form of the cradle is illustrated in Figs. 15 and 16; the cradle indicated generally at 58 may be formed of sheet metal and a pivoted supporting ring 59 is mounted slightly off center in the upper end portion of the cradle as by means of the pins 60 located slightly forward of the center of the ring 59 and journaled in suitable apertures 61 in the upper end of the cradle.

The coffee pot 20' has an enlarged shoulder 20'' adapted to rest upon the ring 59 and this ring has the recessed rear portion 62 through which the plug-in points 32 may pass when the coffee pot is in position in the cradle.

An internal lug 63 may be formed upon one side of the cradle to engage under the ring 59 so as to normally support the coffee pot in vertical position.

Another form of the invention is shown in Figs. 17 and 18 in which the coffee container or other utensil 20e has a diametric groove 64 formed in its bottom wall and a circumferential groove 65 near its lower end.

The band heater indicated generally at 24e may be formed in the manner shown in Fig. 3, but is substantially flat excepting for the upwardly curved rear end 24r.

The terminal block 34e and plug-in points 32e may be secured to this end of the heating unit and a knob 66 is mounted upon the inner side of the unit to engage in the circumferential groove 65 of the utensil.

An upwardly curved spring clip 67 is connected to the other end of the heating unit and provided with a knob 68 to engage in the peripheral groove 65.

With this construction the band heating unit may be easily and quickly attached to or detached from the utensil.

Although the improved heating unit is especially adapted for use upon coffee pots or the lower containers of drip or vacuum coffee makers, it should be understood that it may be applied to any form of utensil in the manner above described, for maintaining the contents thereof at any desired temperature.

Without in any way changing the construction of the invention as illustrated and described the improved heating unit may thus be applied to casseroles, serving dishes, nursing bottles, or any type of utensil used by the housewife or hotels, restaurants or the like for serving foods, liquids, etc., and keeping them at proper serving temperature until used.

I claim:

1. In combination with a utensil having a diametric groove in the exterior of its bottom wall, the side walls of the utensil being recessed at opposite ends of said groove; an electric heating unit in the form of an elongated straight band arranged to fit within said groove, and means at the ends of said band for frictional engagement with the recesses in the side walls of the utensil for detachably mounting said heating unit in said groove.

2. In combination with a utensil having a diametric groove in the exterior of its bottom wall and a circumferential groove near its lower end, an electric heating unit in the form of an elongated band arranged to fit within said diametric groove, one end of said heating unit being upturned, a ball upon said upturned end arranged to fit in said circumferential groove, and an upturned spring member at the other end of said heating unit provided with a ball arranged to fit in said circumferential groove for detachably mounting said heating unit in said diametric groove.

ALBERT C. WILCOX.